UNITED STATES PATENT OFFICE.

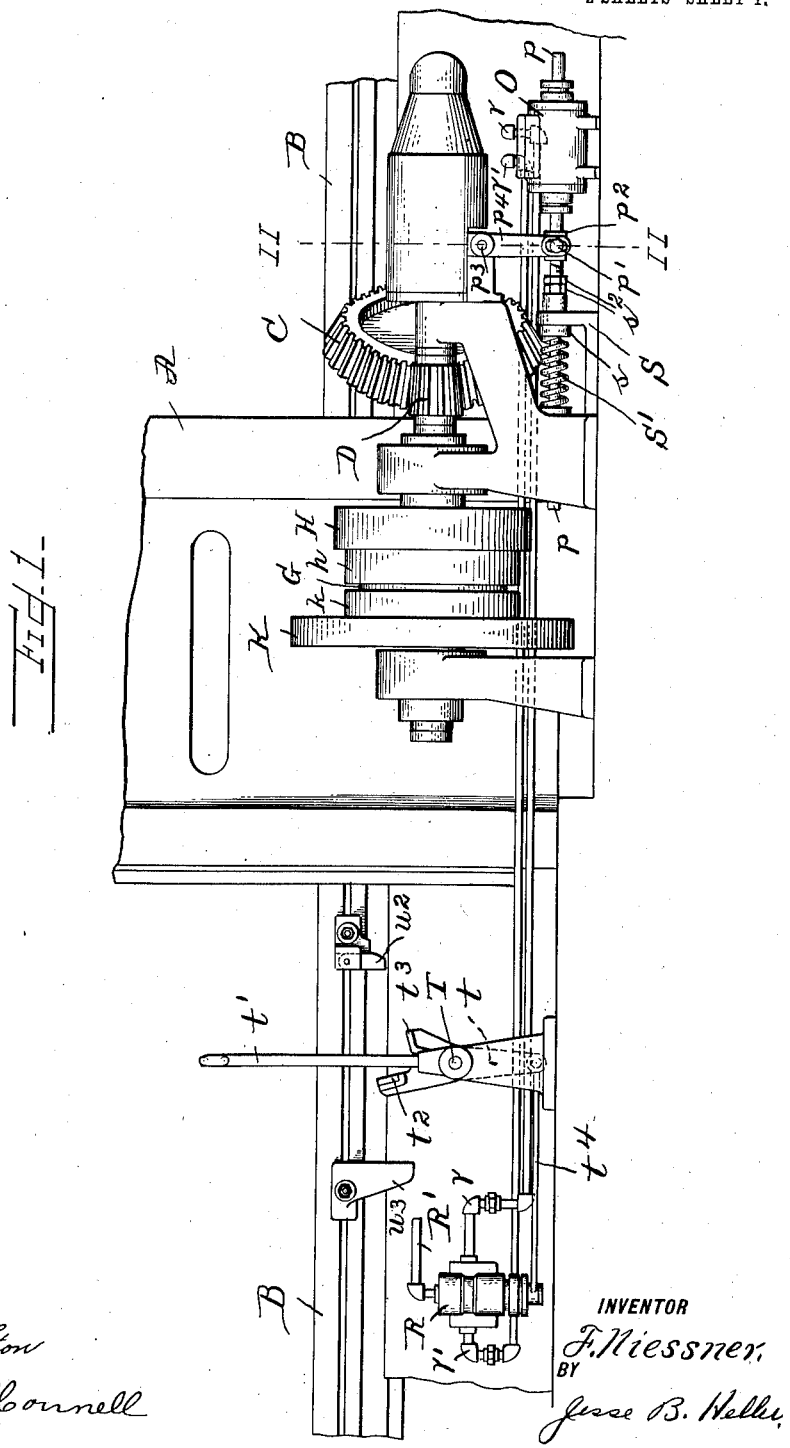

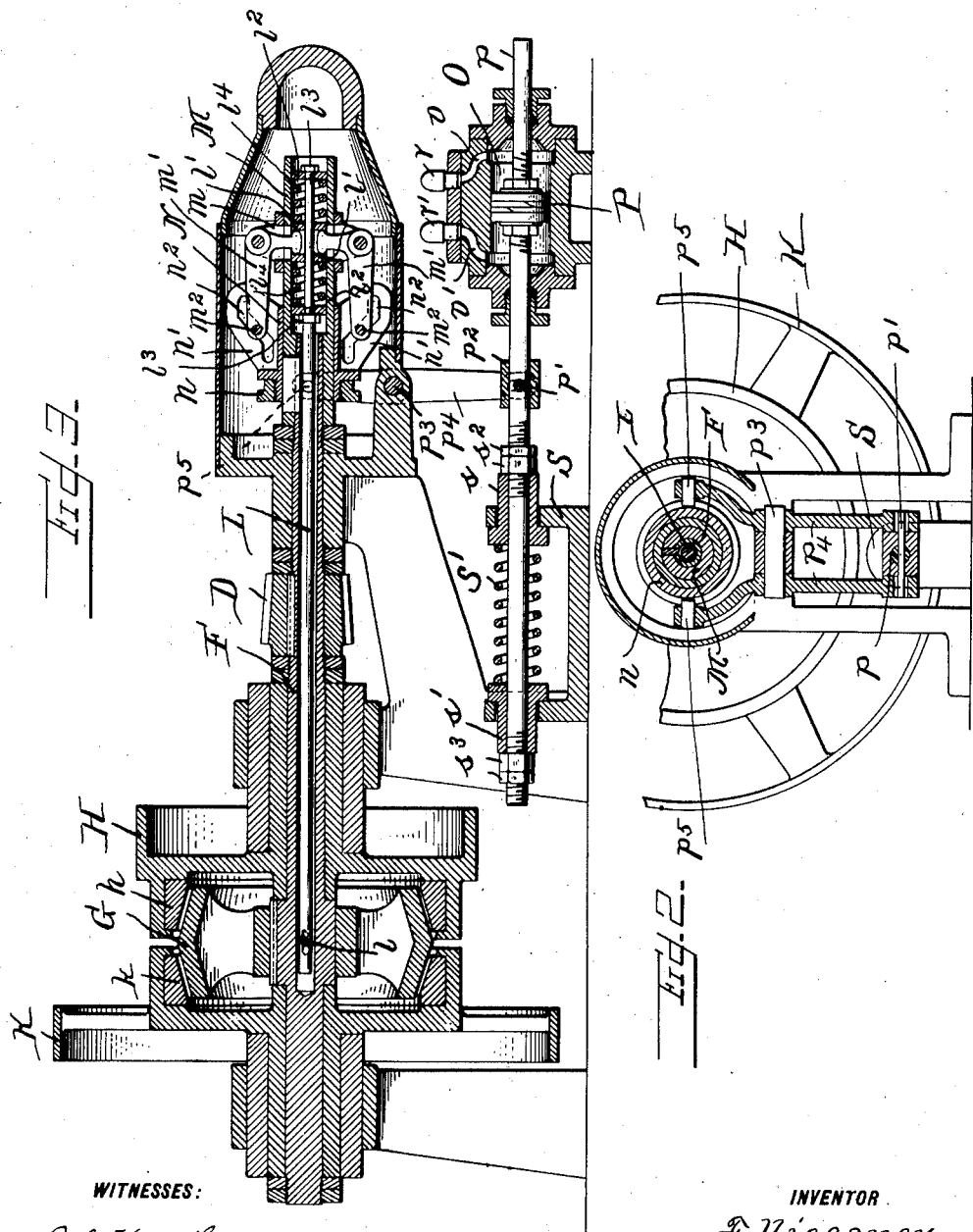

FERDIENANT NIESSNER, OF JOHNSTOWN, PENNSYLVANIA.

CLUTCH-CENTERING MECHANISM.

No. 901,729.  Specification of Letters Patent.  Patented Oct. 20, 1908.

Application filed July 12, 1907. Serial No. 383,521.

*To all whom it may concern:*

Be it known that I, FERDIENANT NIESSNER, of Johnstown, in the county of Cambria and State of Pennsylvania, have invented a new and useful Improvement in Clutch-Centering Mechanism, of which the following is a full, clear, and exact description, reference being had to the accompanying drawings, which form a part of this specification.

My invention has relation to a certain new and useful improvement in pneumatic controlled driving clutch centering mechanism for machine tools, and particularly relates to that class of tools in which the platen is reciprocated by means of suitable gearing, to which is connected one member of a clutch. This clutch member is mounted between two oppositely rotating clutch members, and when in connection with either of the last mentioned clutch members will rotate therewith. In this type of machine tools, the driven clutch member is shifted and held in contact with either of the driving clutch members by means of a piston, operated by pneumatic pressure. This piston is mounted in a cylinder, so that pressure can be applied to move its piston rod in either direction, the direction of the pressure being controlled by means of a valve which is shifted by lugs secured to the moving platen, and also by means of a hand lever secured to the valve mechanism. When the operator desires to bring this type of tool to a state of rest, the hand lever is moved to its central position, which will open the ports on both sides of the piston to exhaust.

The object of my invention is to positively shift the piston and the driven clutch member to its central position, and retain it in that position until the valve is again shifted.

My invention also consists in the novel construction, arrangement and combination of parts as hereinafter described and pointed out in the appended claims, reference being had to the accompanying drawings in which:—

Figure 1, is a side elevation of a portion of a planer with my improved centering mechanism attached; Fig. 2 is a partial section on the line II—II of Fig. 1; Fig. 3 is a vertical section through the driving shaft and clutch mechanism.

A is the main frame of a planer on which is mounted in proper guides the usual reciprocating platen B. This platen is operated by the well known gearing, and is driven from the bevel gear C, which is in turn driven by means of the bevel pinion D. This pinion D is keyed to the hollow shaft F. Also keyed to the shaft F, so as to rotate therewith, but capable of sliding thereon, is the driven clutch member G. Loosely mounted on this shaft, and in suitable bearings, are the driving pulleys H and K; and secured to these pulleys, are the driving clutch members $h$ and $k$ respectively.

L is a rod which projects into the hollow shaft F, and is secured to the clutch member G by means of the pin $l$, which passes through slots in the hollow shaft F. When this rod L is shifted to the right, it carries the driven clutch member G into engagement with the clutch driving member $h$, which will rotate the shaft F in the proper direction to move the platen (to the right) to make a cut, and when the rod L is moved to the left, the clutch member G is moved into engagement with the driving clutch member $k$, which will rotate the shaft F in the proper direction to return the platen (to the left) for the next cut. And when the rod L, and with it the clutch member G, is shifted to its central position, (the position shown in the drawings) the machine is brought to a state of rest.

Secured to the outer end of the shaft L, so as to rotate therewith, is the sleeve M; rigidly mounted on this sleeve, are the brackets $m$, $m$, and pivoted to these brackets $m$, $m$, are the bell cranks $m'$ $m'$. Mounted on the sleeve M, so as to rotate therewith, but slide thereon, is the sleeve N. This sleeve is provided with the grooved collar $n$, and the wings or projections $n'$, $n'$. These wings $n'$, $n'$, are each provided with a cam slot $n^2$. One arm of each of the bell cranks is provided with a pin $m^2$, which projects into its respective cam slot $n^2$, and the other arm of each bell-crank projects through a slot into the sleeve M. Loosely mounted on the rod I, and on each side of the short arm of each of the bell-cranks $m'$, $m'$, are the washers or collars $l'$, $l'$. Surrounding the rod L, and on the outside of each of the collars $l'$, $l'$, is a coil spring $l^4$, $l^4$. These springs are confined between the collars $l'$, $l'$, and the collars $l^2$, $l^2$, and beyond each of the collars $l^2$, $l^2$, are the adjusting nuts $l^3$, $l^3$.

O is a cylinder which is provided with the port $o$ leading into the one end, and the port $o'$ leading into the other end. Mounted within this cylinder, and on the piston rod $p$, is the piston P, and secured to this piston rod by means of the pin $p'$, is a block $p^2$. Mounted on the shaft $p^3$ are the levers $p^4$, $p^4$. One end of each of these levers is provided with a pin $p^5$, which projects into the groove in the collar $n$, and the other end of each of the levers $p^4$ is slotted to receive the pin $p'$.

Secured to the foundation, the floor, or a projection from the main frame of the machine, and in line with piston rod $p$, is the yoke S. Projecting through orifices in the arms of the yoke S, and surrounding the piston rod $p$, are the bushings $s$ and $s'$. These bushings are provided with shoulders of greater diameter than the orifices in the arms of the yoke S. Surrounding the piston rod $p$, and interposed between the shoulders of the bushings $s$ and $s'$, is the coil spring $S'$. And surrounding the piston rod $p$ beyond the bushings $s$ and $s'$, are the adjusting nuts $s^2$ and $s^3$ respectively. The object of these nuts is to adjust the piston rod $p$, and with it the levers $p^4$, $p^4$, so that when the levers are in their central position, the spring $S'$ will force the shoulders of the collars $s$ and $s'$ against the arms of the yoke S.

R, is a valve casing, inclosing a valve which can be of any well known type. Leading into this valve casing, is the pressure supply pipe $R'$, and leading from this valve, to the cylinder O, are the pipes $r$ and $r'$, which connect with the ports $o$ and $o'$ respectively.

Mounted in suitable bearings is the rock shaft T, and secured to this shaft, is the crank lever $t$, the hand lever $t'$, and the levers $t^2$ and $t^3$. The levers $t^2$ and $t^3$ are out of alinement with each other, but are in alinement with the respective projections or striker arms $u^2$ and $u^3$, which are adjustably secured to the side of the moving platen of the planer. Therefore, when the platen is moved (to the right) the projection $u^3$, will strike the lever $t^3$, and rock the shaft T to the right; and when the platen is moved to the left, the projection $u^2$ will strike the lever $t^2$, and rock the shaft in the opposite direction. The hand lever $t'$ is used by the operator to rock the shaft in either direction, as will hereinafter appear.

Pivotally connected to the end of the crank lever $t$, is a link $t^4$, and the other end of this link is connected to a crank which is secured to the end of the stem of the valve in the casing R. Therefore, when the shaft T is rocked, the valve will be shifted to allow the pressure to flow in a predetermined manner.

The operation is as follows:—After the operator has secured the piece to be machined on the platen B, he adjusts the cutting tools and the lugs $u^2$ and $u^3$, so that they will strike the levers $t^2$ and $t^3$ after the proper length of strokes have been given to the platen B. The operator now moves the hand to the right, which will shift the valve through the medium of the crank lever $t$, and the link $t^4$. This will allow the air to flow through the pipe $r$ and port $o$, and move the piston P, and its rod $p$ to the left. This movement of the piston rod will compress the spring S, by means of the bushing $s$, and will rock the levers $p^4$, thereby moving the sleeve N, and the wings $n'$ to the right. This movement of the wings $n'$, by reason of the cams $n^2$ therein, will draw the pins $m^2$ and the long arms of the bell cranks $m'$ toward each other, and force the short arms of the bell-crank levers $m'$ to the right, compressing the right hand spring $l^4$, and forcing the rod L, and the clutch member G, to the right. This movement of the clutch member G to the right, will force it into engagement with the clutch member $n$, which rotates the shaft F, and with it the pinion D, in the proper direction to move the platen B to the right. When the platen has moved a sufficient distance so that the lug $u^3$, strikes and moves the lever $t^3$, rocking the shaft T in the reverse direction, this reverse movement will shift the valve so that pressure will be admitted through the pipe $r'$ and port $o'$, and will open pipe $r$ and port $o$, to exhaust. This reversal of the pressure will shift the piston, and its various connections in the reverse direction, thereby disengaging the clutch member G from the clutch member $n$, and forces it into connection with the clutch member $h$, which will reverse the motion of the gearing and move the platen B to the left. After the platen has been moved to the left a sufficient distance so that the projection $u^2$ strikes and moves the lever $t^2$, the mechanism will again be reversed so that the platen will be moved to the right. When the operator desires to bring the machine to a state of rest, he moves the hand lever $t'$, to its central position, (the position illustrated in the drawings) which will open both ports $o$ and $o'$ to exhaust, and the spring $S'$ will force either the bushing $s$ or $s'$ to its seat and bring the piston, its rod and various connections to their central or off position.

The source of trouble which was met with in this type of machine tools, was the inability of the operator to make a quick and positive stop. The springs $l^4$ were depended upon to bring the clutch member to its central position; consequently the tension of these springs would have to be equal. Another serious trouble which was met with, was the rebounding of these springs when both ports $o$ and $o'$ were opened to stop the machine. Supposing for example, that the right hand spring $l^4$, was under compression, the clutch member G would be in engagement with the clutch member $h$. If the operator would move the valve to its central position, so as to connect both ends of the cylinder with the exhaust, the right hand spring would expand and move the various parts of the clutch mechanism. The momentum and expansion of this spring would compress the left hand spring, and the clutch member G would engage the clutch member k, rebound again, and might move the clutch member G far enough to re-engage the clutch member n. This was a serious fault with machines of this type, as quite frequently the platen was reversed several times before the machine was brought to a state of rest. As the operator did not have perfect control of the machine, he was placed in a dangerous position, and the work on the platen was very often ruined, due to this defect. This fault is overcome by placing an auxiliary spring between positive stops, so that when it has expanded to the limit of its adjustment, it will only have the momentum of the mechanism to overcome, instead of the momentum, plus the expansion of its opposing spring beyond its central position.

Having thus described my invention, what I claim as new, and desire to secure by Letters Patent is:—

1. In a driving mechanism, two driving clutch members, a driven clutch member, the driven clutch member having oppositely disposed working faces to engage either of the driving clutch members, shifting mechanism to shift the driven clutch member into engagement with either of the driving clutch members, a spring to return the clutch members to their disengaged position when the shifting mechanism is released, the movement of the spring being positively restrained from further action when the clutch members have reached their adjusted disengaged position.

2. In a driving mechanism, two driving clutch members rotating in opposite directions, a driven clutch member between the driving clutch members, and having two oppositely disposed working faces to engage either of the driving clutch members, shifting mechanism to shift the driven clutch member into engagement with either of the driving clutch members, a spring to return the driven clutch member to its disengaged position when the shifting mechanism is released, the movement of the spring being positively restrained when the driven clutch member has reached its adjusted disengaged position.

3. In a driving mechanism, two driving clutch members, a driven clutch member between the driving clutch members, and having two oppositely disposed working faces to engage either of the driving clutch members, shifting mechanism to shift the driven clutch member into engagement with either of the driving clutch members, a spring to return the clutch members to their disengaged position when the shifting mechanism is released, the further movement of the spring being confined between stops when the clutches have reached their adjusted disengaged position.

In testimony whereof, I have affixed my signature in presence of two witnesses.

FERDIENANT NIESSNER.

Witnesses:
 LORETTO O'CONNELL,
 H. W. SMITH.